United States Patent
Otaka et al.

(10) Patent No.: US 8,631,211 B2
(45) Date of Patent: Jan. 14, 2014

(54) DISK DRIVE DIAGNOSIS APPARATUS

(75) Inventors: Atsuhiro Otaka, Kawasaki (JP); Daiya Nakamura, Kawasaki (JP); Hidetoshi Satou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 781 days.

(21) Appl. No.: 12/005,352

(22) Filed: Dec. 27, 2007

(65) Prior Publication Data

US 2008/0215809 A1 Sep. 4, 2008

(30) Foreign Application Priority Data

Jan. 31, 2007 (JP) ................................ 2007-021354

(51) Int. Cl.
*G06F 12/00* (2006.01)

(52) U.S. Cl.
USPC .................. 711/149; 711/2; 711/5; 711/114; 711/164

(58) Field of Classification Search
USPC .......................... 711/114, 163, 164, 2, 5, 149
See application file for complete search history.

(56) References Cited

U.S. PATENT DOCUMENTS

| | | | |
|---|---|---|---|
| 6,356,944 B1 * | 3/2002 | McCarty | 709/222 |
| 6,542,954 B1 * | 4/2003 | Aruga | 710/316 |
| 6,785,742 B1 * | 8/2004 | Teow et al. | 710/1 |
| 6,883,059 B2 | 4/2005 | Aruga | |
| 6,976,116 B2 | 12/2005 | Aruga | |
| 2005/0204164 A1 * | 9/2005 | Kakii | 713/201 |
| 2005/0223183 A1 * | 10/2005 | Pherson et al. | 711/163 |
| 2006/0221985 A1 * | 10/2006 | Mishra | 370/401 |
| 2007/0143552 A1 * | 6/2007 | Rastogi et al. | 711/154 |
| 2007/0280141 A1 * | 12/2007 | Sachidanandam | 370/254 |

FOREIGN PATENT DOCUMENTS

JP 2000-222339 8/2000

* cited by examiner

*Primary Examiner* — Reginald Bragdon
*Assistant Examiner* — Gurtej Bansal
(74) *Attorney, Agent, or Firm* — Staas & Halsey LLP (57) ABSTRACT

According to an aspect of an embodiment, a disk drive diagnosis apparatus is included in a RAID system in which a RAID control unit and a drive enclosure that encloses a disk drive are interconnected via a fabric switch. The apparatus comprises a virtual login processing unit configured to virtually execute a login process for a fabric switch of a disk drive and a control unit configured to notify the RAID control unit of a result of the virtual login process and disconnect from a connection line for the RAID control unit a disk drive that has not normally performed the virtual login process relative to the drive enclosure.

9 Claims, 9 Drawing Sheets

FIG. 2A

DISK DIAGNOSIS RESULT TABLE

| DISK NO. | LOOP INITIALIZATION DIAGNOSIS | LOGIN DIAGNOSIS |
|---|---|---|
| 1 | OK | OK |
| 2 | OK | NG |
| 3 | NG | NG |
| : | : | : |

LOGIN DIAGNOSIS RESULT TABLE

| DISK THAT EXISTS ON LOOP | DIAGNOSIS RESULT |
|---|---|
| 1 | OK |
| 2 | NG |
| 3 | DIAGNOSIS IN PROGRESS |
| : | : |

Prior Art

FIG. 9

DISK DRIVE DIAGNOSIS APPARATUS

BACKGROUND OF THE INVENTION

1. Field

This apparatus relates to a disk drive diagnosis apparatus in a RAID system.

2. Description of the Related Art

Figure 8:
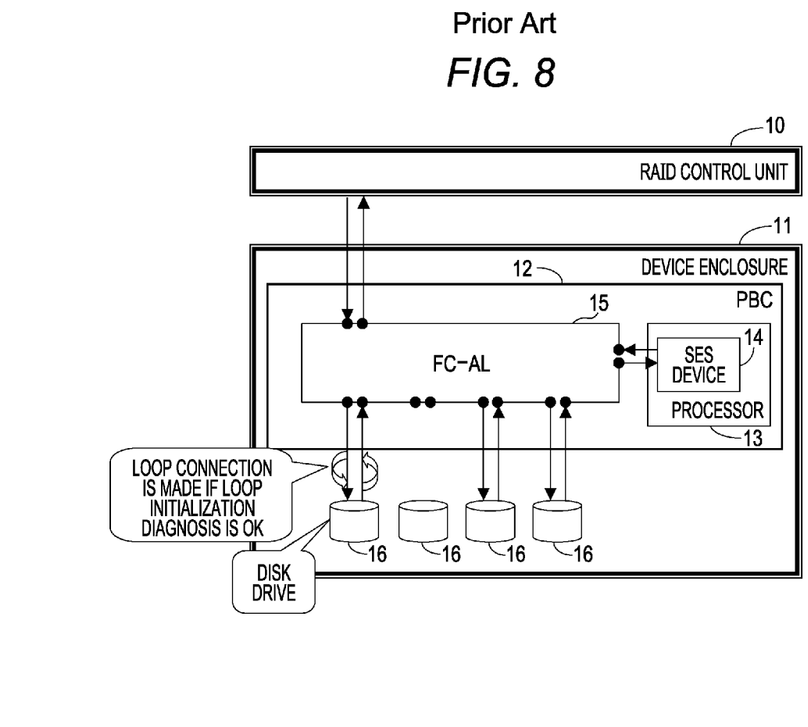
FIG. 8 is a view (No. 1) illustrating a conventional technique.
Figure 9:
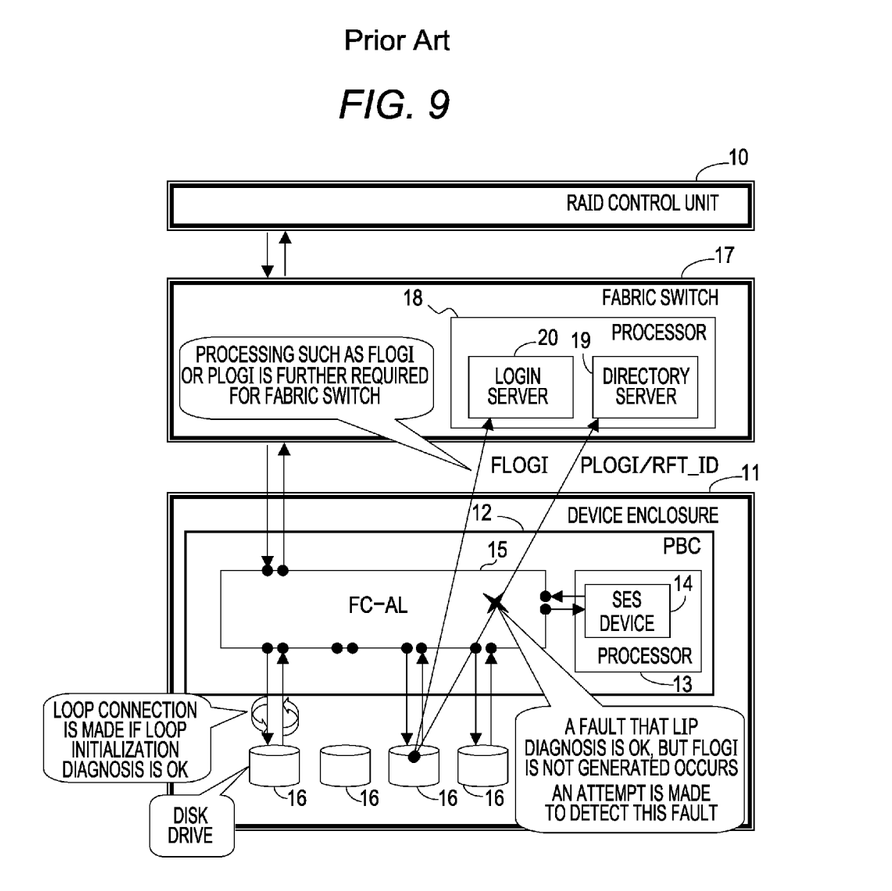
FIG. 9 is a view (No. 2) illustrating the conventional technique.

FIGS. 8 and 9 are diagrams illustrating a conventional technique.

In FIG. 8, each disk drive 16 is housed in a device enclosure 11, and exchanges data with external equipment via a RAID control unit 10. Conventionally, the RAID control unit 10 and the disk drive 16 are interconnected by means of a fiber channel arbitrated loop (FC-AL) 15. In disk drive diagnosis, before a disk drive 16 is connected to a loop of the FC-AL 15, testing is performed as to whether or not loop initialization completes between the disk drive 16 and a port bypass circuit (PBC) 12. If the test result is normal, the disk drive 16 is determined to be normal, and is connected to the loop. If loop initialization does not complete, the disk drive is determined to be faulty, and is disconnected from the loop. A constituent element for making such a loop, thereby checking the disk drive for normality, is the PBC 12. At the same time, the RAID control unit 10 collectively obtains the diagnosis results of the disk drive 16 from the PBC 12, thereby making it possible to recognize the presence of a faulty disk drive.

However, as shown in FIG. 9, in the case where the device enclosure 11 and the RAID control unit 10 are interconnected via a fabric switch 17, the disk drive 16 requires procedures for login responsive to the fabric switch 17 such as FLOGI (login for assigning an address required for the fabric switch 17 to perform routing) or PLOGI (login for assigning a directory name to each disk drive) in addition to connection procedures by the FC-AL 15. These logins are performed for a login server 20 and a directory server 19 that exist in a processor 18 of the fabric switch 17. Therefore, in disk drive diagnosis, in addition to conventional loop initialization diagnosis, it is necessary to perform diagnosis for whether or not login is normally performed and to detect a faulty disk drive. However, this login process is performed without intervening the RAID control unit 10. Thus, there has been only one method for the RAID control unit 10 to issue commands, respectively, to the disk drive 16 and make checks on one-by-one basis in order for the RAID control unit 10 to recognize the presence of a faulty disk drive, such as an incomplete login process (in order to perform login diagnosis). Assume that the RAID control unit 10 issues commands to the disk drive 16 and determines whether or not the disk drive 16 is normal. If a disk drive 16 fails in such a case, no response to the command is provided. Therefore, there is a possibility that the issued command remains in a buffer of a port of a fabric switch connected to the device enclosure, inclusive of the disk drive that has failed, disabling not only the disk drive that has failed but also the entire device enclosure.

SUMMARY

According to an aspect of an embodiment, a disk drive diagnosis apparatus is included in a RAID system in which a RAID control unit and a drive enclosure enclosing a disk drive are interconnected via a fabric switch. The apparatus includes a virtual login processing unit configured to virtually execute a login process for a fabric switch of a disk drive. The apparatus further includes a control unit configured to notify the RAID control unit of a result of the virtual login process and disconnects from a connection line for the RAID control unit a disk drive that has not normally performed the virtual login process relative to the drive enclosure.

DETAILED DESCRIPTION OF THE EMBODIMENTS

In a first embodiment of the inventive apparatus, login diagnosis as to whether or not a disk drive has completed a fabric switch login process is not checked for each disk drive by means of a RAID control unit, but is performed by pre-test using a SES device that exists in a PBC. If a fault is found in the pretest using the SES device, the PBC disconnects the disk drive. Then, the PBC notifies the RAID control unit of the result. If the test result is normal, the disk drive is determined to be normal, and thus, after an entire loop connection, a login process relative to a fabric switch is correctly performed.

In order to perform login diagnosis by a device enclosure only, it is possible to perform diagnosis regardless of the type of fabric switch. In the case where the fabric switch has a similar function, the diagnosis by the device enclosure is not performed.

More specifically, the flow of the operation is as follows:
1. Loop initialization diagnosis is performed.
2. When loop initialization diagnosis is OK, a loop for only a SES device and a disk drive is produced without making connection to an entire loop.
3. The SES device serves as a fabric loop (FL) port in place of a fabric switch, whereby a login process from the disk drive is received, and then, login diagnosis is performed.
4. When at least one of the following faults has been detected in the login process, the disk drive is determined to be faulty, and no connection to the entire loop is made:
    A disk drive that issues FLOGI, but does not issue PLOGI within a predetermined period of time thereafter
    A disk drive that issues PLOGI, but does not issue RFT_ID within a predetermined period of time thereafter
    A disk drive in which a fabric switch attempts to return a response to FLOGI, PLOGI, or RFT_ID (command for making registration to name server that provides directory service), but cannot receive a response thereto.
5. When diagnosis of all the disk drives has completed, the SES device stops serving as a fabric switch, and is connected to a fabric switch, whereby loop initialization is re-executed, and an ordinary connection mode is established.

FIGS. 1 to 4 are diagrams illustrating the first embodiment of the inventive apparatus.

Figure 1:
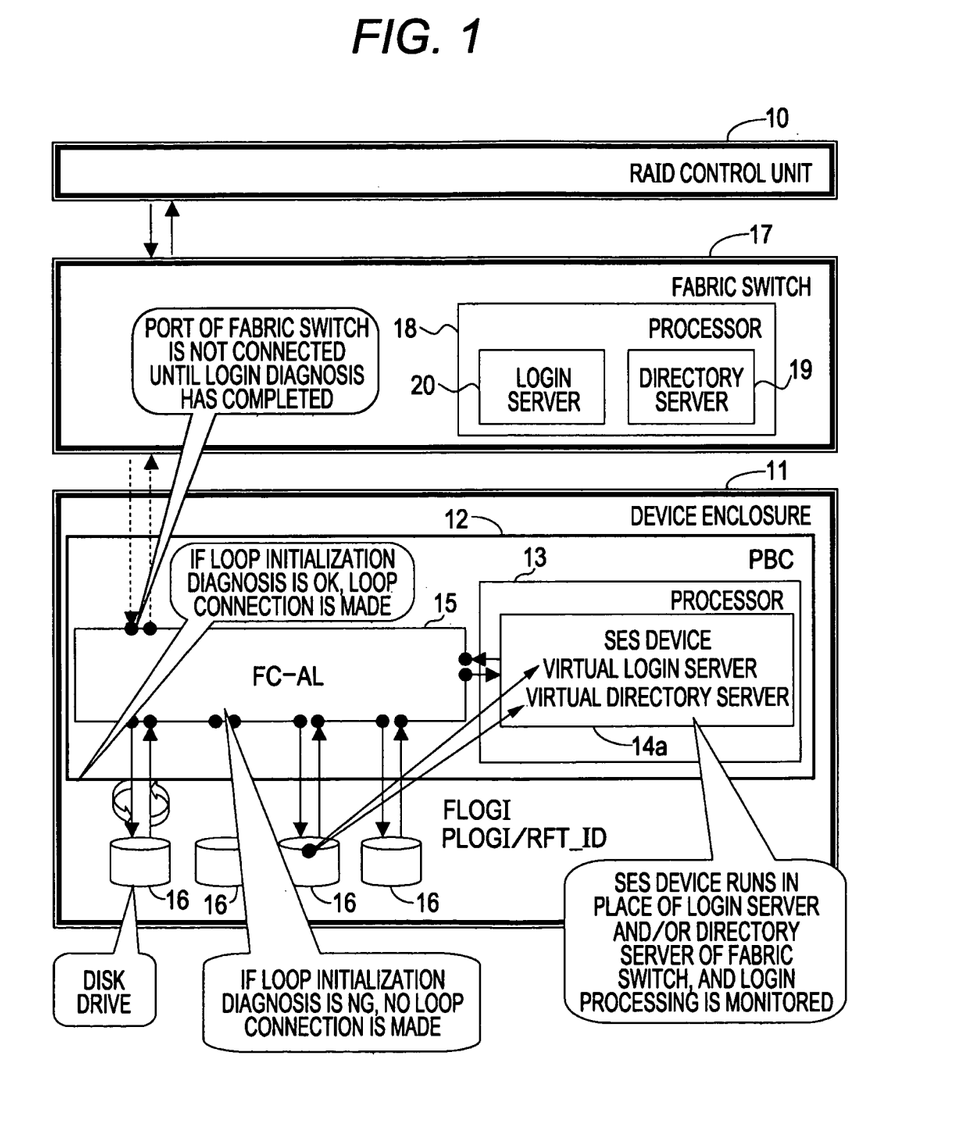
FIG. 1 is a view (No. 1) illustrating a first embodiment of the inventive apparatus.

In FIG. 1, a disk drive 16 forms a loop in its own input/output port, and then, performs loop initialization diagnosis for diagnosing whether or not its own operation is normal. In the case where loop initialization diagnosis is NG, the disk drive 16 is not connected to a FC-AL 15. In the case where loop initialization diagnosis is OK, it is connected to the FC-AL 15. At this time point, only a disk drive 16 of which the result of loop initialization diagnosis has been OK is connected to the FC-AL 15, and a loop that is not connected is formed at a fabric switch 17. A virtual login server and a virtual directory server, which perform login diagnosis in place of a login server 20 and a directory server 19 of the fabric switch 17, are provided in a SES device 14a of a processor 13 connected to the FC-AL 15. The virtual login server and the virtual directory server accept login from the disk drive 16 connected to the FC-AL 15, and diagnoses as to whether or not each disk drive can be normally logged in. If, as a result of login diagnosis, a disk drive has existed which cannot be normally logged in, the disk drive 16 is disconnected from the FC-AL 15. After login diagnosis of the virtual login server and the virtual directory server has completed, only a normal disk drive 16 is connected to the FC-AL 15. Therefore, the FC-AL 15 is connected to the fabric switch 17 to cause each disk drive 16 to perform a login process.

Figure 2A:
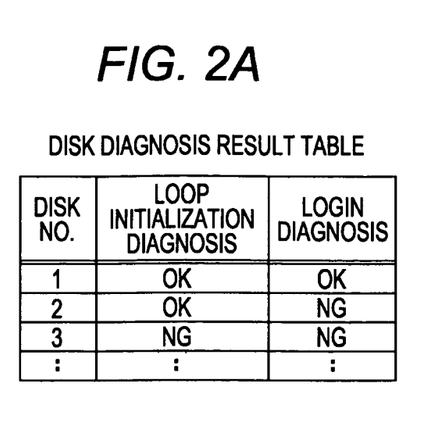
FIGS. 2A-2B are a view (No. 2) illustrating the first embodiment of the inventive apparatus.
Figure 2B:
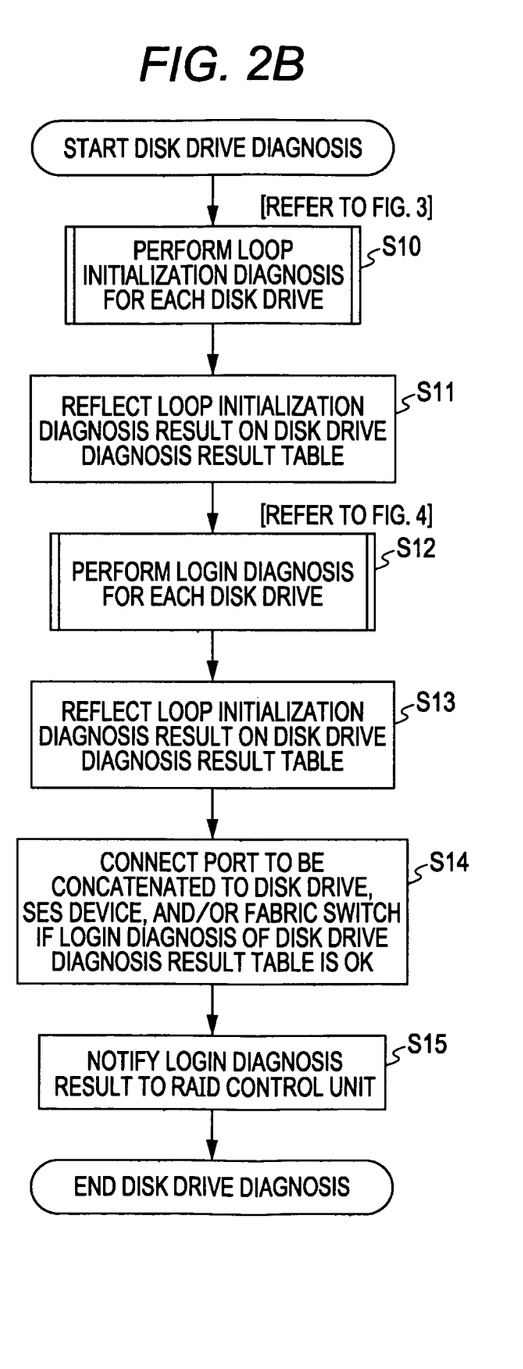

FIG. 2 shows an entire flow of disk drive diagnosis in the first embodiment.

Figure 3:
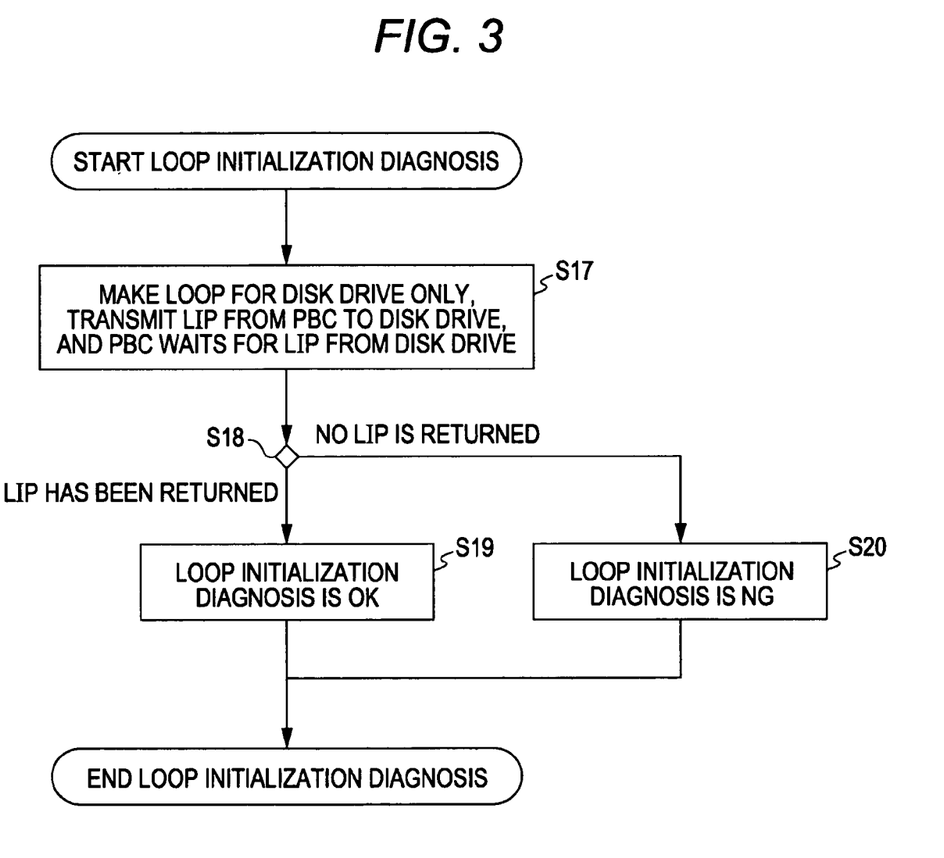
FIG. 3 is a view (No. 3) illustrating the first embodiment of the inventive apparatus.

In FIG. 2B, first, loop initialization diagnosis is performed on a disk drive basis in step S10 (refer to FIG. 3 for detail). In step S11, a loop initialization diagnosis result is included in a disk drive diagnosis result table. While the disk drive diagnosis result table is shown in FIG. 2A by way of example, the results of loop initialization diagnosis and login diagnosis are stored relative to numbers of disk drives. In step S12, login diagnosis is performed on a disk drive basis (refer to FIG. 4 for detail). In step S13, the loop initialization diagnosis result is included in the disk drive diagnosis result table. In step S14, the disk drive and SES device of which login diagnosis results in the disk drive diagnosis result table is OK and a port concatenated to a fabric switch are connected to each other. In step S15, the RAID control unit is notified of the login diagnosis result, and then, the disk drive diagnosis process is terminated.

FIG. 3 shows a processing flow of loop initialization diagnosis.

In step S17, a loop for a disk drive only is produced, and LIP (Loop Initialization Primitive) is transmitted from a PBC to the disk drive. Then, the PBC waits for LIP to be returned from the disk drive. In step S18, it is determined whether or not LIP has been returned. In the case where the determination result is affirmative in step S18, it is determined that the loop initialization diagnosis result is OK and the loop initialization diagnosis is terminated in step S19. In the case where the determination result is negative in step S18, it is determined that the loop initialization diagnosis result is NG and the loop initialization diagnosis is terminated in step S20.

Figure 4:
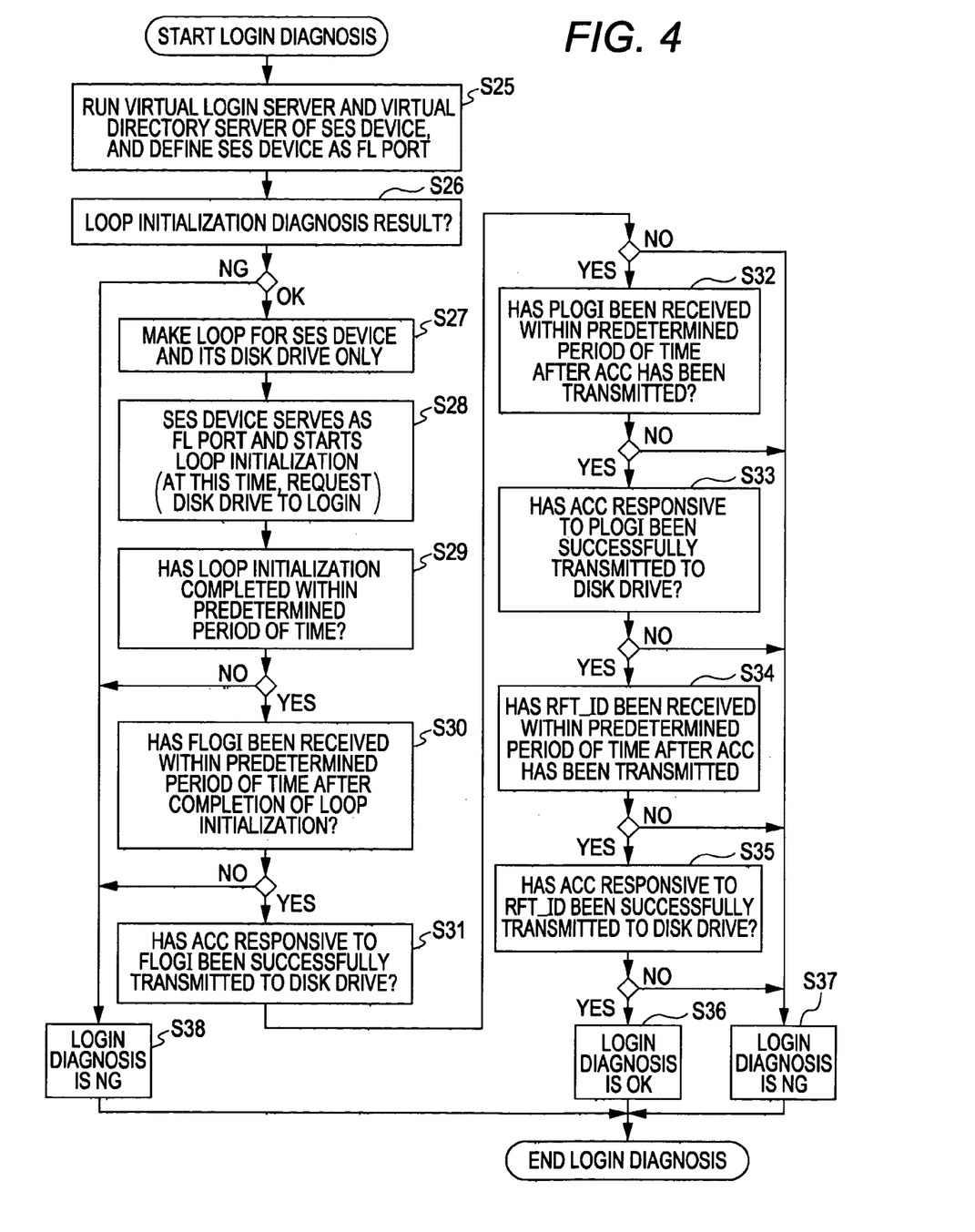
FIG. 4 is a view (No. 4) illustrating the first embodiment of the inventive apparatus.

FIG. 4 shows a flow of login diagnosis on a disk drive basis by means of a SES device.

In step S25, a virtual login server and a virtual directory server of the SES device are run, and the SES device is defined as a FL port. In step S26, a result of loop initialization diagnosis is determined. When the result of loop initialization diagnosis is NG, the current step proceeds to step S38. When the result is OK, the current step proceeds to step S27. In step S27, a loop for the SES device and one disk drive that performs login diagnosis only is produced. In step S28, the SES device serves as a FL port, and starts loop initialization. At this time, this device requests the disk drive to login. In step S29, it is determined whether or not loop initialization has completed within a predetermined period of time. When the determination result is No, the current step proceeds to step S38. When the determination result is "Yes", it is determined whether or not FLOGI has been received within a predetermined period of time after the completion of loop initialization in step S30. When the determination result is No, the current step proceeds to step S38. In step S38, it is determined that login diagnosis is NG, and the login diagnosis is terminated. When the determination result is "Yes", the current step proceeds to step S31. In step S31, it is determined whether or not ACC (ACCept, so-called acknowledgement) responsive to FLOGI has been successfully transmitted to the disk drive. When ACC has not been successfully transmitted, the current step proceeds to step S37. When ACC has been successfully transmitted, it is determined whether or not PLOGI has been received within a predetermined period of time after ACC has been transmitted in step S32. When the determination result is No, the current step proceeds to step S37. When the determination result is "Yes", it is determined whether or not ACC responsive to PLOGI has been successfully transmitted to the disk drive in step S33. When the determination result is No, the current step proceeds to step S37. When the determination result is "Yes", it is determined whether or not RFT_ID has been received within a predetermined period of time after ACC has been transmitted in step S34. When the determination result is No, the current step proceeds to step S37. When the determination result is "Yes", it is determined whether or not ACC responsive to RFT_ID has been successfully transmitted to the disk drive in step S35. When the determination result is No, the current step proceeds to step S37. In step S37, it is determined that login diagnosis is NG, and the login diagnosis is terminated. When the determination result is "Yes", it is determined that login diagnosis is OK, and the login diagnosis is terminated.

Figure 5:
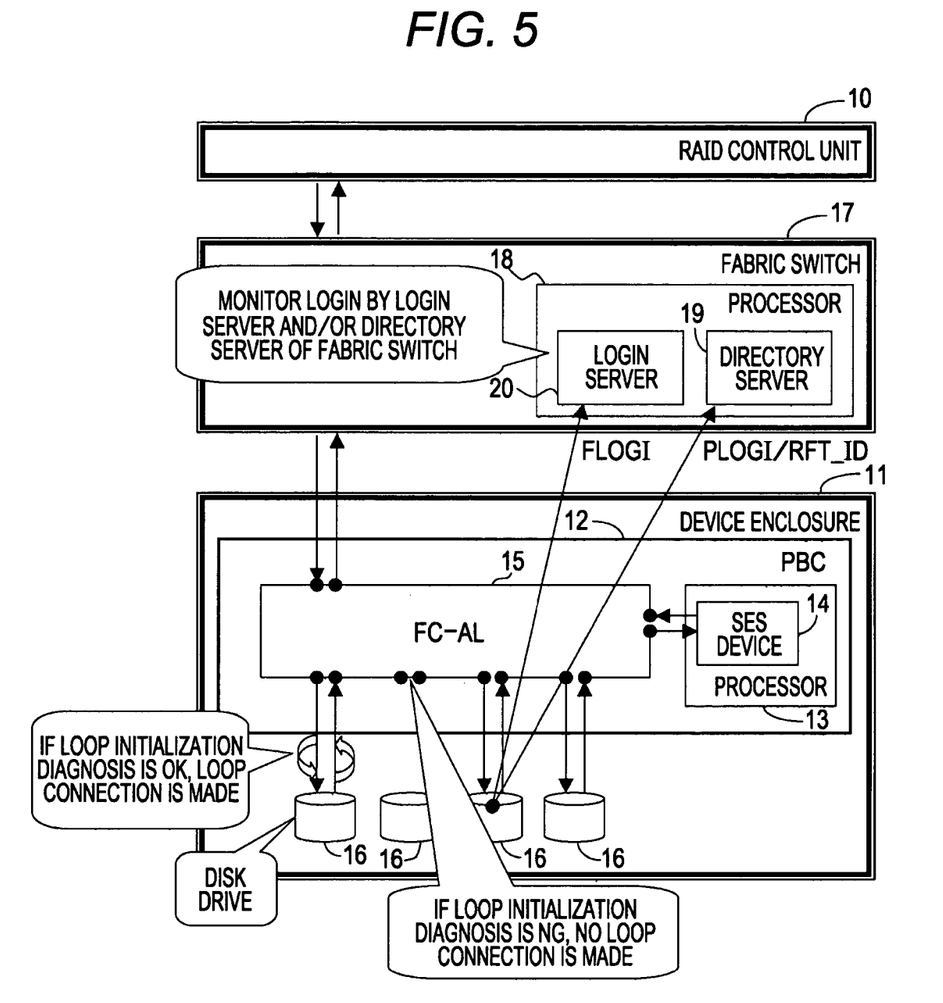
FIG. 5 is a view (No. 1) illustrating a second embodiment of the inventive apparatus.
Figure 6A:
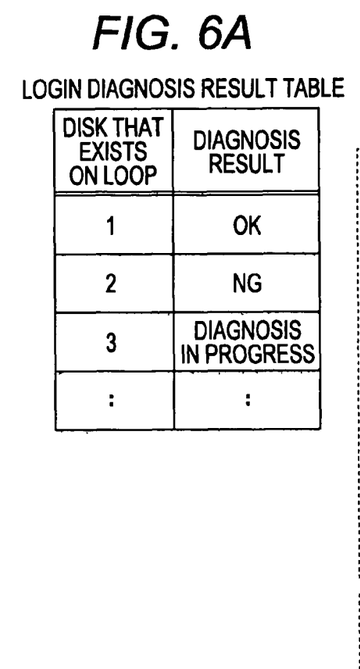
FIGS. 6A-6B are a view (No. 2) illustrating the second embodiment of the inventive apparatus.
Figure 6B:
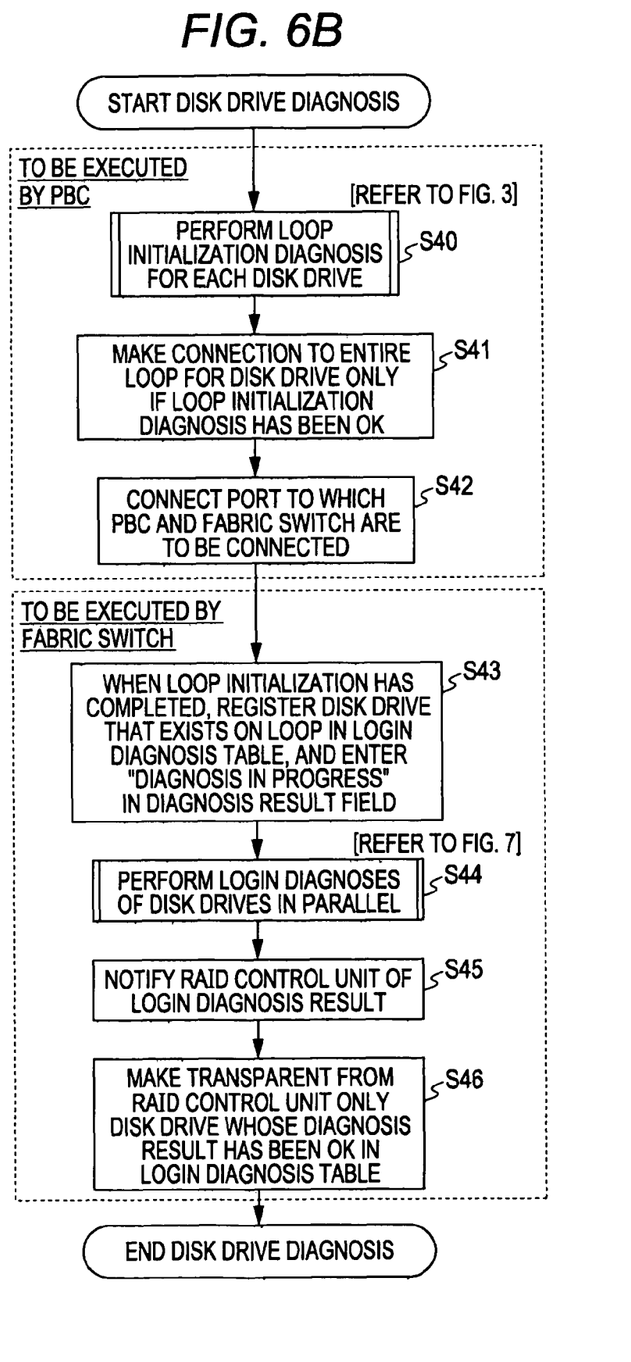
Figure 7:
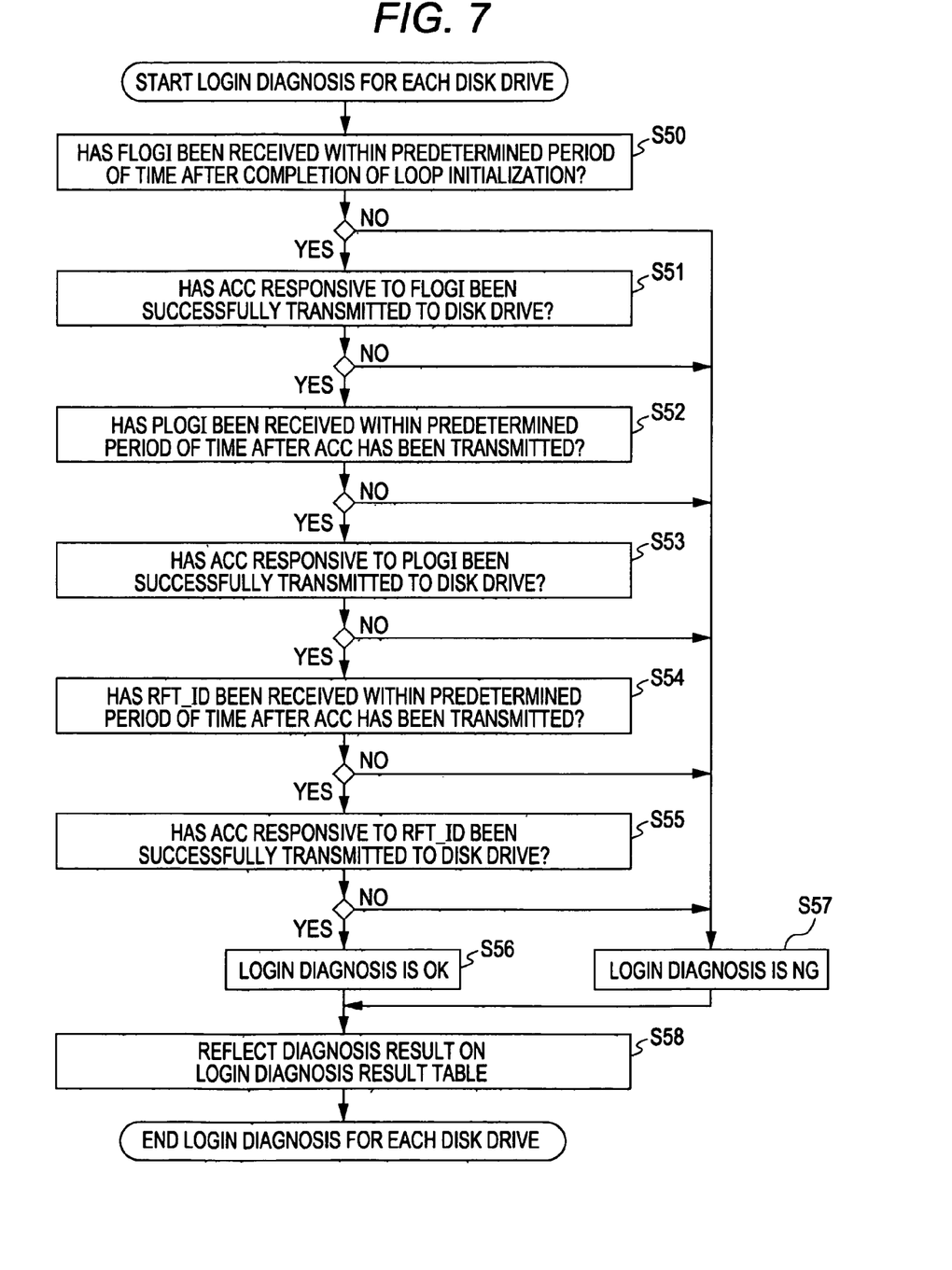
FIG. 7 is a view (No. 3) illustrating the second embodiment of the inventive apparatus.

FIG. 5 is a diagram illustrating a second embodiment of the inventive apparatus. FIGS. 6A, 6B, and 7 are flowcharts illustrating a second embodiment of the inventive apparatus.

In the second embodiment of the inventive apparatus, a check is made by a fabric switch in place of the SES device of the first embodiment. A RAID control unit or a PBC is notified of a result, so that a disk drive is disconnected.

More specifically, at least one of the following disk drives is determined to be a faulty disk drive, and the faulty disk drive is notified:

A disk drive that takes part in a loop, but does not issue FLOGI within a predetermined period of time A disk drive that issues FLOGI, but does not issue PLOGI within a predetermined period of time thereafter A disk dive that issues PLOGI, but does not issue RFT_ID within a predetermined period of time thereafter A disk drive in which a fabric switch attempts to return a response to FLOGI, PLOGI, or RFT_ID, but the return cannot be received In FIG. 5, first, a disk drive 16 forms a loop at its own port, and performs loop initialization diagnosis. If OK, the disk drive is connected to a FC-AL 15. Next, the FC-AL 15 is connected to a fabric switch 17. The disk drive 16 attempts to login relative to a login server 20 and a directory server 19 provided in a processor 18 of the fabric switch 17. In the case where the disk drive can be normally logged in, the login server 20 and the directory server 19 determine that the login diagnosis result of the disk drive is OK. In the case where a disk drive cannot be normally logged in, it is determined that the disk drive is NG. Then, the login server 20 and the directory server 19 report the result of the login process to a RAID control unit 10, notifies a PBC of the disk drive of which the diagnosis result is NG, and disconnects the disk drive from the FC-AL 15.

FIGS. 6A and 6B illustrate a flow of disk drive diagnosis of the second embodiment.

In FIG. 6B, first, loop initialization diagnosis is performed on a disk drive basis in step S40 (refer to FIG. 3 for detail). In step S41, only a disk drive of which loop initialization diagnosis has been OK is connected to an entire loop (FC-AL 15). In step S42, a port to which the PBC and the fabric switch are to be connected is also connected. The PBC executes steps S40 to S42.

Next, in step S43, a disk drive that exists on a loop (FC-AL 15) when loop initialization has completed is registered in a login diagnosis table, and diagnosis in process is entered in the diagnosis result field. An exemplary login diagnosis table is shown in FIG. 6A. In the login diagnosis table, the number of a disk drive that exists in a loop and the diagnosis result are associated with each other to be registered. In step S44, login diagnosis of each disk drive is performed in parallel (refer to FIG. 7 for detail). Next, in step S45, the RAID control unit is notified of the login diagnosis result. In step S46, only the disk drive of which the diagnosis result has been OK in the login diagnosis table is made transparent from the RAID control unit, and disk drive diagnosis is terminated. The fabric switch executes steps S43 to S46.

FIG. 7 shows a flow of login diagnosis by means of the fabric switch.

First, in step S50, it is determined whether or not FLOGI has been received within a predetermined period of time after the completion of loop initialization. When the determination result is No, the current step proceeds to step S57. When the determination result is "Yes", it is determined whether or not ACC responsive to FLOGI has been successfully transmitted to a disk drive in step S51. When the determination result is "No," the current step proceeds to step S57. When the determination result is "Yes", it is determined whether or not PLOGI has been received within a predetermined period of time after ACC has been transmitted in step S52. When the determination result is "No", the current step proceeds to step S57. When the determination result is "Yes", it is determined whether or not ACC responsive to PLOGI has been successfully transmitted to a disk drive in step S53. When the determination result is "No," the current step proceeds to step S57. When the determination result is "Yes", it is determined whether or not RFT_ID has been received within a predetermined period of time after ACC has been transmitted in step S54. When the determination result is "No", the current step proceeds to step S57. When the determination result is "Yes", it is determined whether or not ACC responsive to RFT_ID has been successfully transmitted to a disk drive in step S55. When the determination result is "No", the current step proceeds to step S57. In step S57, it is determined that a login diagnosis result is NG, and the current step proceeds to step S58. When the determination result of step S55 is "Yes", it is determined that a login diagnosis result is OK in step S56, and the current step proceeds to step S58. In step S58, the diagnosis result is included in the login diagnosis result table, and login diagnosis on a disk drive basis is terminated.

While the processing steps shown in FIG. 7 are performed on a disk drive basis, the fabric switch executes those steps for all the disk drives connected to the FC-AL.

What is claimed is:

1. A disk drive diagnosis apparatus in a RAID system in which a RAID controller and a drive enclosure that encloses a disk drive are interconnected via a fabric switch, the apparatus comprising:

a storage which stores a disk drive diagnosis result table that stores results of loop initialization diagnoses and login diagnoses relative to numbers of disk drives;

a processor; and a memory which stores a plurality of instructions, which when executed by the processor, cause the processor to execute,     virtually executing a login process in place of a fabric switch of a disk drive and accepting a login from the disk drive based on the disk drive diagnosis result table; and     notifying the RAID controller of a result of the virtual login process and disconnecting from a connection line for the RAID controller the disk drive if the disk drive has not normally performed the virtual login process relative to the drive enclosure,     determining the disk drive is normal, and a login process relative to the fabric switch is correctly performed after the virtual login process is executed, if a test result is normal based on the disk drive diagnosis result table.

2. The disk drive diagnosis apparatus according to claim 1, wherein said disk drive diagnosis apparatus is provided in a device enclosure.

3. The disk drive diagnosis apparatus according to claim 1, wherein said disk drive diagnosis apparatus is provided in a fabric switch.

4. The disk drive diagnosis apparatus according to claim 1, further comprising assigning an address for access to the disk drive and a directory service for registering an address of the disk drive in a directory.

5. The disk drive diagnosis apparatus according to claim 1, wherein a connection line for the RAID controller forms a loop.

6. The disk drive diagnosis apparatus according to claim 1, further comprising:

executing loop initialization diagnosis on the disk drive,     wherein the login process is virtually executed when the loop initialization diagnosis is normally performed.

7. The disk drive diagnosis apparatus according to claim 1, further comprising:

connecting a port concatenated to the fabric switch when the virtual login process is normally performed.

8. A disk drive diagnosis apparatus, comprising:

a storage which stores a disk drive diagnosis result table that stores results of loop initialization diagnoses and login diagnoses relative to numbers of disk drives;

a processor; and a memory which stores a plurality of instructions, which when executed by the processor, cause the processor to execute,     notifying a RAID controller of a result of a virtual login process executed in place of a fabric switch and disconnecting from a connection line a disk drive if the disk drive has failed to execute the virtual login process,     determining the disk drive is normal, and a login process relative to the fabric switch is correctly performed after the virtual login process is executed, if a test result is normal based on the disk drive diagnosis result table.

9. A disk drive diagnosis method, comprising:

storing a disk drive diagnosis result table that stores results of loop initialization diagnoses and login diagnoses relative to numbers of disk drives;

notifying, by a computer processor, a RAID controller of a result of a virtual login process executed in place of a fabric switch and disconnect from a connection line a disk drive that failed to execute the virtual login process,     determining the disk drive is normal, and a login process relative to the fabric switch is correctly performed after the virtual login process is executed, if a test result is normal based on the disk drive diagnosis result table.

\* \* \* \* \*